(12) United States Patent
Ercken

(10) Patent No.: US 6,440,881 B1
(45) Date of Patent: Aug. 27, 2002

(54) PAPER MACHINE FELT

(75) Inventor: Harald Ercken, Duren (DE)

(73) Assignee: Thomas Josef Heimbach Gesellschaft mit beschranker Haftung & Co. (DE)

( * ) Notice: Subject to any disclaimer, the term of this patent is extended or adjusted under 35 U.S.C. 154(b) by 0 days.

(21) Appl. No.: 09/522,298

(22) Filed: Mar. 9, 2000

(30) Foreign Application Priority Data

Mar. 12, 1999 (DE) ..................................... 299 04 546 U

(51) Int. Cl.[7] ................................................. D04H 1/08
(52) U.S. Cl. ......................... 442/320; 428/57; 428/58; 428/60
(58) Field of Search ........................... 442/320; 428/57, 428/58, 60

(56) References Cited

U.S. PATENT DOCUMENTS 4,564,985 A    1/1986  Tanabe ........................ 28/142
4,698,250 A   10/1987  Talonen et al. ................ 428/58
5,277,967 A  * 1/1994  Zehle et al. ................. 428/234

FOREIGN PATENT DOCUMENTS

| AT | 128673   | 2/1932 |
| DE | 68910901 | 5/1999 |
| EP | 0108733  | 5/1984 |
| EP | 0354738  | 2/1990 |

* cited by examiner

*Primary Examiner*—Terrel Morris
*Assistant Examiner*—Norca L. Torres
(74) *Attorney, Agent, or Firm*—Liniak, Berenato, Longacre & White, LLC

(57) ABSTRACT

Paper machine felt for use in a papermaking machine, and especially at the press section, incorporates an adhesive which takes up the draw forces on the seam joint between the stepped surfaces of the ends of the belt when mated together to form a continuous belt.

26 Claims, 1 Drawing Sheet

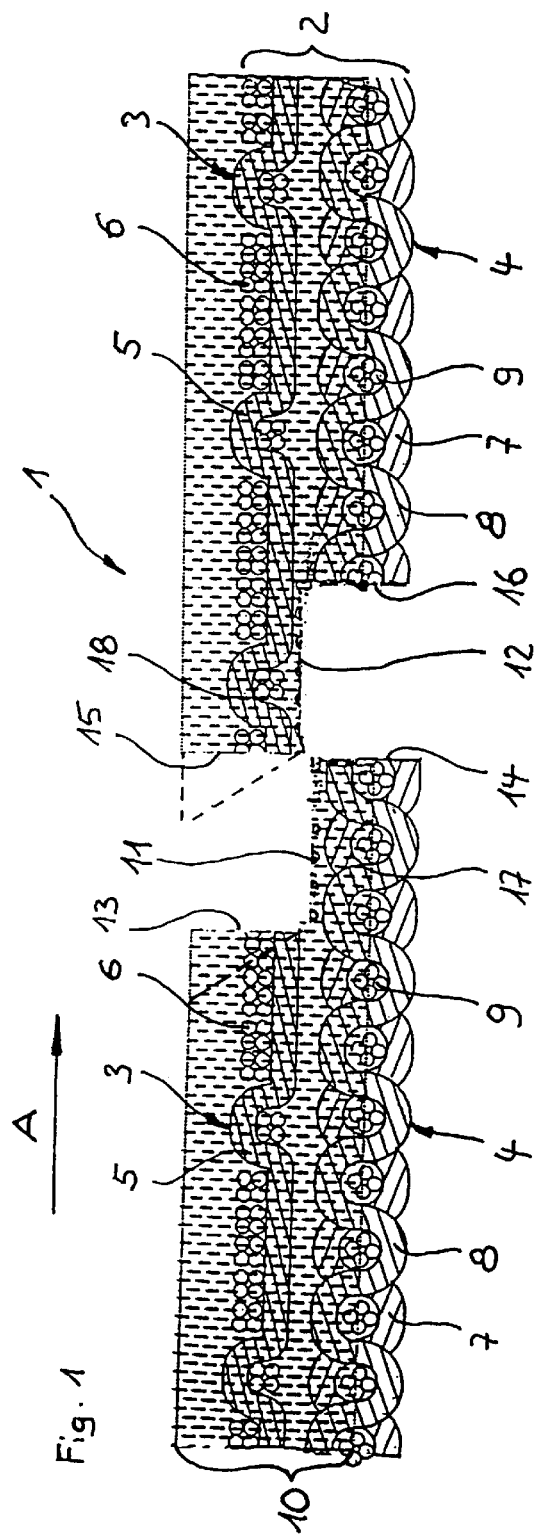

PAPER MACHINE FELT

The invention concerns a paper machine felt for utilization especially in the press area of a paper machine, with a woven base and a fibrous layer, or lap, that is needled onto the woven base, with the woven base being equipped with at least two layers and the free ends of the paper machine felt being equipped with complementing steps with steps surfaces that extend between at least two layers, and with the paper machine felt being provided with a connecting element that transfers tensile force in closed condition and via which the ends can be or are tied.

A typical paper machine felt is described, for example, in U.S. Pat. No. 4,564,985. The paper machine felt has a woven base, or ground fabric, onto which a lap is needled from the paper side, with the fibers interspersing the woven base. The woven base consists of two superimposed fabrics, with the fabric on the machine side having double layers.

Such paper machine felts can be produced as endless material. There is however also the possibility of producing a seamed paper machine felt, equipping it with a pintle wire seam (see also EP-A-0 108 733, U.S. Pat. No. 4,698,250). Such felts are easier to mount in the paper machine. Production of such a felt occurs by equipping the woven base, which is initially closed with the pintle wire, with a needled-on lap and that then the paper machine felt is opened up for assembly into the press area of a paper machine by pulling out the wire. Before this step, the needled-on lap is cut open parallel to the wire seam so that a flap is created above the wire seam. The cutting process can also occur through the formation of complementing steps with step surfaces that extend between at least two woven base layers (U.S. Pat. No. 4,698,250).

During assembly in the paper machine, the ends of the paper machine felt are first connected with each other by sliding the wire into loops provided for this purpose. The wire then represents the connecting element, via which the tensile force is transferred during operation. After connection through the wire, the fronts of the flap and that of the next lap are glued or needled together, with gluing possibly also occurring with a spray-on hot melt type adhesive (see EP-A-0 354 738).

Gluing only occurs for the purpose of fastening the flap and has no effects associated with transferring the tensile force.

A wire seam will always represent discontinuity. This applies particularly to paper machine felts of the kind described here with multi-layer woven bases. Discontinuity leads to paper marks and vibration at high operating speeds. Additionally, a wire seam's stability is limited.

The invention is therefore based on the task of designing the seam on a paper machine felt of the kind described above in such a way that discontinuity in the seam area and therefore paper marks and vibration are largely avoided, and also that no stability problems arise.

This task is resolved with the invention by utilizing the adhesive as the connecting element that transfers the tensile force. The invention's basic idea is therefore not to create a wire seam, but rather to transfer the tensile force that occurs during revolutions in the paper machine via a glued joint or seam.

Surprisingly, it was proven that such a glued joint can provide sufficient tensile strength if appropriate gluing surfaces are available. For this, an overlapping of the step surfaces of 5 to 15 cm in running direction is sufficient. The connecting seam formed in this manner, however, is not only more durable; it also prevents paper marks and vibration at high operating speeds since the invented connecting seam basically forms no discontinuity and is at best affected only slightly in its permeability and compressibility.

One embodiment of the invention provides for at least one, preferably both, of the step surfaces to be equipped with an adhesive layer, via which the ends can be connected through activation or are connected upon activation.

According to another feature of the invention, the fronts are equipped with an adhesive layer on at least one end of the paper machine felt.

The adhesive layer should not be continuous, but rather porous so that permeability in this area is not limited at all or only insignificantly. This can occur by spraying on the adhesive, by utilizing adhesive felt or employing a grid design. The adhesive layer should preferably consist of a hot melt type adhesive, like the one described in EP-A-0 354 738, for example. Alternatively, the adhesive layer can also be formed by adhesive fibers that are incorporated into the lap.

As with wire seams, the seam generally runs at a right angle to the running direction of the paper machine felt. There is also the possibility of allowing the connecting seam to extend diagonally to the running direction.

The invention is described more closely in the drawing by means of an example. It shows:

FIG. 1 Longitudinal section through the seam area of a paper machine felt before closing the connecting seam and FIG. 2 cross-section of FIG. 1 after closing the connecting seam.

The paper machine felt 1 depicted in FIGS. 1 and 2 is shown with a woven base, marked 2, which is formed by two separate fabrics 3, 4 that are superimposed. The fabric 3 close to the paper side is equipped with longitudinal threads 5, which are interwoven with thin cross-threads—marked 6 in the example. The fabric 4 on the machine side is equipped with longitudinal threads 7,8, which are interwoven with multiple-thread cross-threads—marked 9 in the example. The longitudinal threads 5 and the cross-threads 6 of the fabric 3 on the paper side are thinner than the longitudinal threads 7, 8 and cross-threads 9 of the fabric 4 on the machine side.

A lap 10 is needled on from the paper side, i.e. from above, and is needled on up to the center area of the machine-side fabric 4. Due to the needling process it is very tight, providing a smooth and soft surface on the paper side.

The ends of the paper machine felt 1 have a graduated design so that complementing surfaces 11, 12 are formed between the fabrics 3, 4 and opposing fronts 13, 14 or 15, 16 above and beneath. This in turn creates a bridge 17 on the bottom on the left end of the paper machine 1 and a bridge 18 on the top on the right end, with the lower bridge 17 consisting of fabric 4 and a portion of the lap 10, while the upper bridge 18 consists of the fabric 3 with the lap 10. The bridges 17 and 18 extend in the same direction as the running direction (Arrow A) of the paper machine felt 1.

The paper machine felt 1 is initially produced at overlength. The ends of the paper machine felt 1 are then cut vertically. After that, incisions are incorporated on the left side from above and on the right side from beneath at a distance to the ends, in accordance with the depth of the planned step. Then the step surfaces 11, 12 are created by horizontally cutting the lap between the fabrics 3, 4, while removing the top and bottom cut strip of lap 10 and fabric 3, 4, respectively, so that a step design in accordance with FIG. 1 is obtained.

Upon assembly of the paper machine felt 1 in the paper machine, two suitable strips of hot melt type adhesive felt are placed onto the step surface 11, 12 and the bridges 17, 18 are overlapped so that the step surfaces 11, 12 are on top of each other. Then the hot melt type adhesive felt pieces are activated by applying heat so that the hot melt type adhesive plasticizes. At the same time, the step surfaces 11, 12 are pressed on top of each other. This creates an adhesive layer 19, which firmly connects the step surfaces 11, 12 after cooling off. The stability of this connection is so high that the tensile force in the paper machine can be transferred without difficulty.

Instead of a flat ground fabric, or woven base, 2, an endless circular fabric base can be utilized as well, which is then needled together with a felt layer. The paper machine felt must then be cut, and the cut area must be treated appropriately so that complementing steps, like those shown in FIG. 1, are created.

In the example shown, the fronts 13, 14 or 15, 16 are aligned vertically to the running direction (Arrow A). At least the fronts 13, 15 close to the paper side can also be aligned diagonally to the running direction (Arrow A) (dotted line) so that here as well an overlapping area of the lap 10 is created.

What is claimed is:

1. Paper machine felt (1) for utilization particularly in the press area of a paper machine with first and second free ends, one woven base (2) and a lap (10) that is needled onto the woven base (2), with the woven base (2) being equipped with at least two layers (3, 4) and the free ends of the paper machine felt (1) being equipped with step surfaces (11, 12) extending between at least two layers (3, 4) and connected with an adhesive (19), and with the paper machine felt (1) being equipped with a connecting element that transfers tensile force in closed condition, via which the ends are or can be connected, the adhesive (19) is the connecting element that transfers all tensile force.

2. Paper machine felt according to claim 1, characterized by the fact that at least one of the step surfaces (11, 12) is equipped with an adhesive layer (19), via which the ends can be or are connected.

3. Paper machine felt according to claim 1, characterized by the fact that also the first and second free ends have front edges (13, 14 or 15, 16) provided with an adhesive layer (19) on at least one free end of the paper machine felt (1).

4. Paper machine felt according to claim 2, characterized by the fact that the adhesive layer(s) (19) consist(s) of fibers of an adhesive that can be activated, with the fibers being integrated in the felt layer.

5. Paper machine felt according to claim 2, characterized by the fact that the adhesive layer(s) (19) is/are not continuous, but porous.

6. Paper machine felt according to claim 2, characterized by the fact that the adhesive layer(s) (19) consist(s) of a hot melt type adhesive.

7. A paper machine felt having first and second free ends, a woven base comprising first and second layers, and a lap that is needled onto the woven base, the first and second free ends of the felt including step surfaces extending between said first and second layers and an adhesive connecting said first free end to said second free end, wherein said adhesive is necessary to maintain the integrity of the connection between the first and second free ends.

8. The paper machine felt of claim 7 wherein a layer of adhesive is provided on the step surfaces.

9. The paper machine felt of claim 7 wherein the first and second free ends include front surfaces and wherein an adhesive layer is provided on at least one of the front surfaces.

10. The paper machine felt of claim 8 wherein the adhesive layer is porous.

11. The paper machine felt of claim 7 wherein said adhesive comprises a hot melt adhesive.

12. A paper machine felt having connectable first and second free ends comprising:
    a woven base including first and second layers;
    a lap layer needled onto the woven base;
    step surfaces on the first and second free ends of the felt extending between said first and second layers; and
    an adhesive connecting said first free end to said second free end, whereby all tensile forces are transmitted from said first end to said second end via said adhesive.

13. The paper machine felt of claim 12 wherein a layer of adhesive is provided on the step surfaces.

14. The paper machine felt of claim 12 wherein the first and second free ends include front surfaces and wherein an adhesive layer is provided on at least one of the front surfaces.

15. The paper machine felt of claim 13 wherein the adhesive layer is porous.

16. The paper machine felt of claim 12 wherein said adhesive comprises a hot melt adhesive.

17. A paper machine felt comprising:
    a woven base having first and second layers;
    a lap needled onto the woven base;
    a first free end including a step surface extending between said first and second layers;
    a second free end including a step surface extending between said first and second layers, said second free end being connected to said first free end with an adhesive and without the use of mechanical fasteners.

18. The paper machine felt of claim 17 wherein a layer of adhesive is provided on the step surfaces.

19. The paper machine felt of claim 17 wherein the first and second free ends include front surfaces and wherein an adhesive layer is provided on at least one of the front surfaces.

20. The paper machine felt of claim 18 wherein the adhesive layer is porous.

21. The paper machine felt of claim 17 wherein said adhesive comprises a hot melt adhesive.

22. A paper machine felt comprising:
    a woven base having first and second layers;
    a lap needled onto the woven base;
    a first free end including a step surface extending between said first and second layers;
    a second free end including a step surface extending between said first and second layers, said second free end being connected to said first free end with an adhesive, wherein, but for the presence of said adhesive, said first end would separate from said second end.

23. The paper machine felt of claim 22 wherein a layer of adhesive is provided on the step surfaces.

24. The paper machine felt of claim 22 wherein the first and second free ends include front surfaces and wherein an adhesive layer is provided on at least one of the front surfaces.

25. The paper machine felt of claim 23 wherein the adhesive layer is porous.

26. The paper machine felt of claim 22 wherein said adhesive comprises a hot melt adhesive.

* * * * *